April 4, 1939. H. M. DODGE 2,153,414
METHOD OF MAKING GASKETS
Filed Feb. 26, 1936
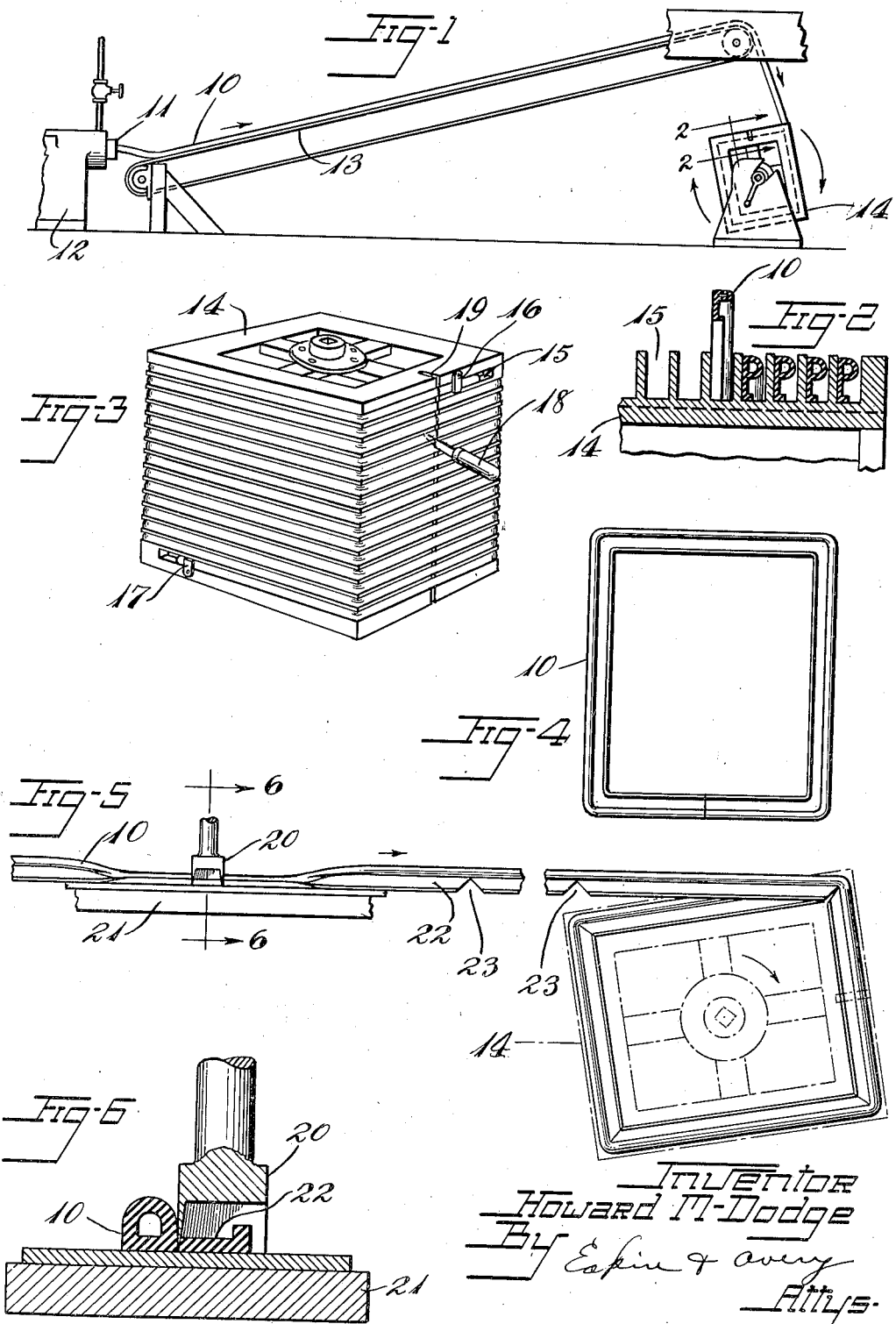
Inventor
Howard M Dodge
By Eskin & Avery
Attys.

Patented Apr. 4, 1939

2,153,414

UNITED STATES PATENT OFFICE 2,153,414

METHOD OF MAKING GASKETS

Howard M. Dodge, Akron, Ohio, assignor to The B. F. Goodrich Company, New York, N. Y., a corporation of New York Application February 26, 1936, Serial No. 65,839

4 Claims. (Cl. 18—6)

This invention relates to the manufacture of rubber gaskets.

Such gaskets, of polygonal form, are used extensively to seal the door openings of refrigerators and the like and comprise generally a gasket portion of deformable rubber material and a retaining portion adapted to be retained in a groove. Due to the rectangular form of the door opening it has been necessary to form the gasket of separate strips or to notch the gasket material where it is to turn a corner. Great difficulty has been encountered in accurately cutting the gasket material so as to avoid leaks at the corners.

The principal objects of this invention are to attain accuracy and security in the forming of the gasket, and simplicity and efficiency of operation in its manufacture.

Other objects will appear from the following description and the accompanying drawing.

Of the drawing:

Fig. 1 is a side elevation of the preferred form of apparatus used in performing the method.

Fig. 2 is a fragmentary cross-section of the curing drum taken on line 2—2 of Fig. 1.

Fig. 3 is a perspective view of the curing drum.

Fig. 4 is a plan view of the finished gasket.

Fig. 5 is a view showing a modification of the method in which a notching step is used.

Fig. 6 is a section taken on line 6—6 of Fig. 5 showing the gasket in cross-section and the notching die and supporting anvil.

Referring to the drawing, the gasket material 10 is formed by a die 11 of an extruding machine 12 to the desired cross-sectional dimensions. The plastic strip then passes over a conveyor 13 and is wound about a polygonal drum 14. The drum 14 is formed with a helical groove 15 adapted to receive and support the gasket strip. One end of the strip is clamped to the drum by a clip 16 and the strip is then wound in the groove until the other end of the groove is reached. Here a second clip 17 is applied to retain the end of the strip. The sides of the groove 15 prevent tipping of the strip and, as the strip is in a warm and plastic condition, the strip conforms to the groove at the corners to provide the corners of the gasket.

The gasket strip is vulcanized by placing the drum with the strip thereon in a steam vulcanizer and there applying heat and pressure.

After vulcanization a knife 18 is drawn along an axial groove 19, formed in the drum and intersecting the helical groove, and the strip is separated into individual polygonal gaskets.

Where the desired gasket is of such width that practice of the preferred method would buckle the gasket at its corners, a die 20 and an anvil 21 are used to notch the strip as it passes to the drum. In the example shown the strip 10 is of P-shape in cross-section and the retaining web 22 of the strip is notched as at 23 with a V-shaped die at intervals corresponding to the position of the corners of the drum. The material is then wound onto the drum and the bending of the strip adjacent the notches closes the notches. The strip being plastic, the freshly cut margins of the notches heel together where they contact with each other. Any slight inaccuracy in cutting the notches is corrected by slightly stretching the strip as it is laid around the drum if the spacing is too close, or by shrinkage of the strip in curing if the spacing is too great.

Whether or not the notching step is employed, the forming of the corners about an accurately dimensioned drum before the strip is vulcanized insures the production of accurately dimensioned gaskets.

I claim:

1. The method of making gaskets of polygonal form which comprises notching a strip of plastic material at spaced intervals, winding the strip about a polygonal form with its notched portions adjacent corners thereof, and vulcanizing the strip while it is conformed to the form.

2. The method of making gaskets of polygonal form which comprises notching a strip of plastic material at spaced intervals, helically winding the strip about a polygonal form with its notched portions adjacent corners thereof, vulcanizing the strip while it is conformed to said drum, and severing the strip axially of said drum to provide a plurality of gaskets.

3. The method of making a polygonal rubber article which comprises forming a strip of unvulcanized rubber composition, weakening the strip at intervals without destroying its continuity, bending the strip at its weakened places to form a polygon, and supporting the strip in polygonal shape while vulcanizing the same.

4. The method of making a polygonal rubber article which comprises forming a strip of unvulcanized rubber composition, notching the strip at intervals, bending the strip at its notched places to form a polygon, and supporting the strip in polygonal shape while vulcanizing the same.

HOWARD M. DODGE.